United States Patent
Aoki

(10) Patent No.: US 6,815,076 B2
(45) Date of Patent: Nov. 9, 2004

(54) SILICONE PRESSURE-SENSITIVE ADHESIVE COMPOSITION AND PRESSURE-SENSITIVE ADHESIVE TAPE

(75) Inventor: Shunji Aoki, Gunma-ken (JP)

(73) Assignee: Shin-Etsu Chemical Co. Ltd., Tokyo (JP)

( * ) Notice: Subject to any disclaimer, the term of this patent is extended or adjusted under 35 U.S.C. 154(b) by 0 days.

(21) Appl. No.: 10/253,596

(22) Filed: Sep. 25, 2002

(65) Prior Publication Data

US 2003/0091837 A1 May 15, 2003

(30) Foreign Application Priority Data

Sep. 25, 2001 (JP) ........................................ 2001-290863

(51) Int. Cl.$^7$ .......................... B32B 15/08; B32B 15/20; C08L 83/00
(52) U.S. Cl. ...................... 428/448; 428/447; 428/450; 524/323; 524/324; 524/330; 524/331; 524/333; 524/334; 524/335; 524/339; 524/342; 524/343; 524/344; 524/349; 524/588; 528/15; 528/31; 528/32
(58) Field of Search ................................. 428/447, 448, 428/450; 524/323, 324, 330, 331, 333, 334, 335, 342, 343, 344, 349, 588; 528/15, 31, 32

(56) References Cited

U.S. PATENT DOCUMENTS

| 3,983,298 | A |  | 9/1976 | Hahn et al. |
|---|---|---|---|---|
| 3,989,667 | A | * | 11/1976 | Lee et al. ................... 525/478 |
| 5,543,457 | A |  | 8/1996 | Lewis et al. |
| 6,010,646 | A | * | 1/2000 | Schleifstein ................ 252/500 |
| 6,605,238 | B2 | * | 8/2003 | Nguyen et al. .............. 252/502 |
| 2002/0164493 | A1 | * | 11/2002 | Miyazaki et al. ........... 428/520 |

FOREIGN PATENT DOCUMENTS

| JP |  | 54-37907 B2 |  | 11/1979 |  |  |
|---|---|---|---|---|---|---|
| JP |  | 03128968 A | * | 5/1991 | ........... | C08L/83/04 |

OTHER PUBLICATIONS

Chemical Abstracts registry information for Irganox 565.*

* cited by examiner

*Primary Examiner*—Margaret G. Moore
*Assistant Examiner*—Marc S Zimmer
(74) *Attorney, Agent, or Firm*—Birch, Stewart, Kolasch & Birch, LLP

(57) ABSTRACT

A pressure-sensitive adhesive tape having a cured layer of a silicone pressure-sensitive adhesive composition containing a phenolic antioxidant is attached to an adherend of metal, typically copper for bonding or masking purposes. Even after exposure to elevated temperatures of 150–250° C., the tape can be smoothly peeled from the adherend without leaving any adhesive residue.

4 Claims, No Drawings

US 6,815,076 B2

SILICONE PRESSURE-SENSITIVE ADHESIVE COMPOSITION AND PRESSURE-SENSITIVE ADHESIVE TAPE

This invention relates to a silicone pressure-sensitive adhesive composition and a pressure-sensitive adhesive tape which when is effectively attached to metals such as copper and leaves no adhesive residues after peeling off.

BACKGROUND OF THE INVENTION

Pressure-sensitive adhesive tapes and labels using silicone pressure-sensitive adhesive compositions are utilized under rigorous environments where conventional pressure-sensitive adhesive compositions such as acrylic, rubber, urethane and epoxy base compositions can be altered or degraded. This is because silicone pressure-sensitive adhesive composition layers have excellent heat resistance, freeze resistance, weather resistance, electrical insulation and chemical resistance.

Such pressure-sensitive adhesive tapes are generally prepared by applying silicone pressure-sensitive adhesive compositions to plastic films or suitable supports and effecting crosslinking reaction to cure the compositions for improving tackiness.

Typical forms of pressure-sensitive adhesive tape include heat resistant pressure-sensitive adhesive tape and heat resistant masking tape in which pressure-sensitive adhesive compositions are applied to heat resistant supports, and chemical resistant masking tape.

In the manufacture of printed circuit boards, the heat resistant masking tape and chemical resistant masking tape are used during etching, plating and soldering steps for preventing the processing solution (e.g., etching solution, plating solution) and solder from contacting unnecessary areas of electronic parts. While it should be avoided that when the adhesive tape is contacted with or immersed in the processing fluid or held under processing temperature conditions, the adhesive tape peels off or partially separates away allowing the area to be protected to be contaminated, it is also required that at the end of processing, the adhesive tape be smoothly peeled from the part without allowing residues of the adhesive to transfer to or remain on the part. If the adhesive transfers to or remains on the part, it can cause troubles in the ensuing manufacture of printed circuit boards.

The above-mentioned tape is also used during the manufacture of semiconductor devices for protecting lead frames or securing lead pins of lead frames. Even when the tape is exposed to elevated temperatures of 150 to 250° C. in the steps of securing and bonding, wire bonding, and resin encapsulating of semiconductor chips, the adhesive layer should not peel off or partially separate away. Once the operation is completed, the tape must be peeled without allowing the adhesive to transfer to or remain on the adherend.

Regrettably, if a conventional pressure-sensitive adhesive tape using silicone adhesive is exposed to elevated temperatures of 150 to 250° C. after attachment to a metal portion, especially of copper, copper alloy or iron, for bonding or masking purposes, the pressure-sensitive adhesive layer undergoes cohesive failure upon removal of the pressure-sensitive adhesive tape by peeling. Then some adhesive is left on the metal portion, or the adhesive layer transfers from the tape support to the metal portion. This is generally referred to as adhesive residue.

SUMMARY OF THE INVENTION

An object of the invention is to provide a silicone pressure-sensitive adhesive composition which even after exposed to elevated temperatures of 150 to 250° C. during the attachment to adherends of metals such as copper, copper alloys and iron for bonding or masking purposes, can be smoothly peeled from the adherend without leaving any adhesive residue; and a pressure-sensitive adhesive tape using the same.

It has been found that when a phenolic antioxidant is contained in a silicone pressure-sensitive adhesive composition, especially when a phenolic antioxidant is contained in a silicone pressure-sensitive adhesive composition of the addition reaction curing type comprising a linear polydiorganosiloxane in which vinyl-bearing backbone is composed of $R^1_2SiO$ units, a polyorganosiloxane of three-dimensional structure composed of $R^1_3SiO_{0.5}$ units and $SiO_2$ units, and a polyorganohydrosiloxane or platinum compound as a curing catalyst, as disclosed in JP-B 54-37907, there is obtained a silicone pressure-sensitive adhesive composition which is effectively attached to metals such as copper and does leave no adhesive residue after removal from the metal. The preferred phenolic antioxidant is a phenolic compound having in a molecule a structure of the following formula:

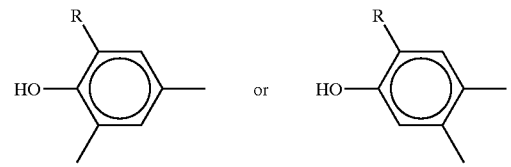

wherein R is a monovalent hydrocarbon group having 1 to 6 carbon atoms, preferably tert-butyl. The use of such a phenolic antioxidant enhances the benefit of the invention that when the pressure-sensitive adhesive is attached to a copper board or copper wiring, heat aged at 150 to 250° C., and thereafter, peeled therefrom, it leaves no adhesive residue on the copper.

Therefor, the present invention provides a silicone pressure-sensitive adhesive composition comprising a phenolic antioxidant.

In one preferred embodiment, a silicone pressure-sensitive adhesive composition comprising the following components (A) to (F) is provided.

(A) 20 to 80 parts by weight of an alkenyl group-containing polydiorganosiloxane, (B) 80 to 20 parts by weight of a polyorganosiloxane containing $R^1_3SiO_{0.5}$ units and $SiO_2$ units in a molar ratio between 0.6 and 1.7 wherein $R^1$ is a monovalent hydrocarbon group having 1 to 10 carbon atoms, (C) a SiH group-containing polyorganosiloxane in an amount to provide 0.5 to 20 mol of SiH groups per mol of alkenyl groups in component (A), (D) 0 to 5.0 parts by weight per 100 parts by weight of components (A) and (B) combined of a retarder, (E) a platinum catalyst in an amount to give 1 to 5,000 ppm of platinum based on the weight of components (A) and (B) combined, and (F) 0.1 to 10 parts by weight per 100 parts by weight of components (A) and (B) combined of a phenolic antioxidant in the form of a phenolic compound having in a molecule a structure of the following formula:

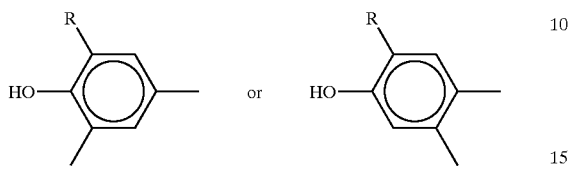

wherein R is a monovalent hydrocarbon group having 1 to 6 carbon atoms, typically tert-butyl.

Also contemplated herein is a pressure-sensitive adhesive tape comprising a cured layer of the silicone pressure-sensitive adhesive composition lying on at least one surface of plastic film.

The silicone pressure-sensitive adhesive composition and tape are useful as masking tape intended for electrical and electronic parts comprising copper or copper alloy.

DESCRIPTION OF THE PREFERRED EMBODIMENTS

According to the present invention, a silicone pressure-sensitive adhesive composition comprising a phenolic antioxidant is provided. The phenolic antioxidant used herein is preferably a phenolic compound having in a molecule a structure of the following formula:

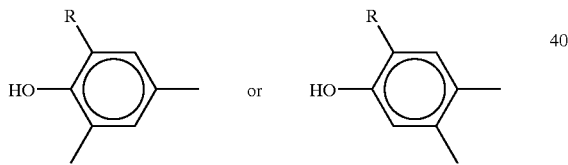

wherein R is a monovalent hydrocarbon group having 1 to 6 carbon atoms, typically alkyl group, most preferably tert-butyl.

Illustrative examples of the phenolic antioxidant are shown below. Note that $^t$Bu is tert-butyl.

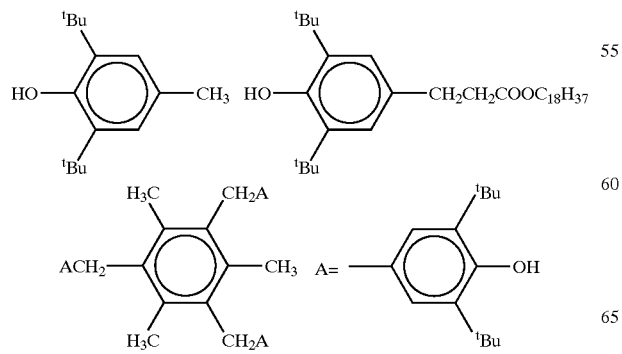

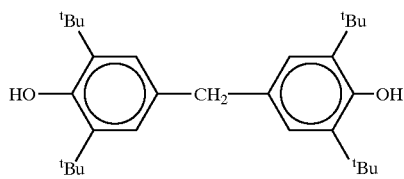

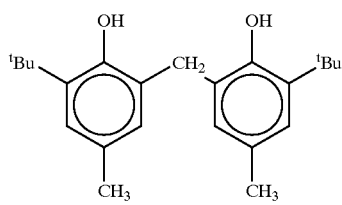

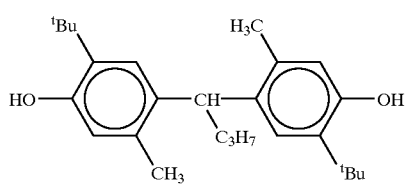

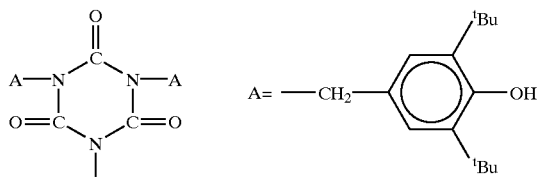

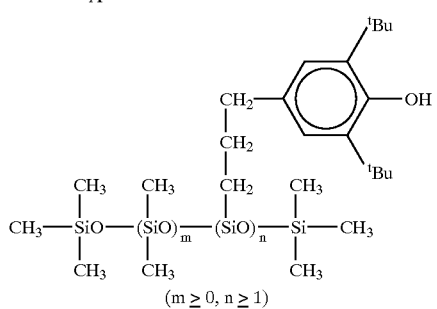

$(m \geq 0, n \geq 1)$

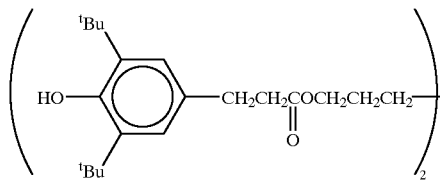

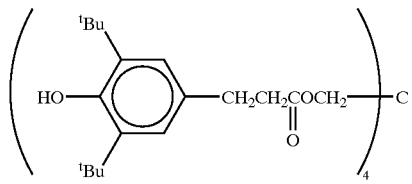

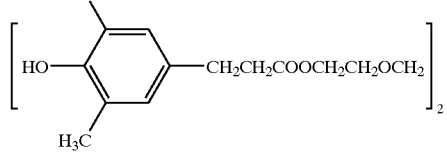

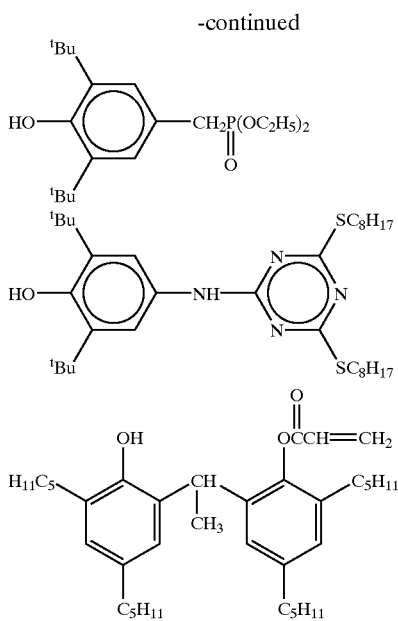

The phenolic antioxidant is blended in an amount of 0.05 to 20%, especially 0.1 to 10% by weight of the entire silicone pressure-sensitive adhesive composition.

As used herein, the silicone pressure-sensitive adhesive composition may be selected from various compositions of well-known formulation and curing type, preferably silicone pressure-sensitive adhesive compositions of the addition reaction curing type.

Preferred silicone pressure-sensitive adhesive compositions contain the following components:

(A) an alkenyl group-containing polydiorganosiloxane,
(B) a polyorganosiloxane containing $R^1_3SiO_{0.5}$ units and $SiO_2$ units,
(C) a SiH group-containing polyorganosiloxane (i.e., polyorganohydrogensiloxane),
(D) a retarder,
(E) a platinum catalyst, and
(F) the phenolic antioxidant defined above.

They are described in detail. First, component (A) is an alkenyl group-containing polydiorganosiloxane, which is preferably represented by either of the formulae below;

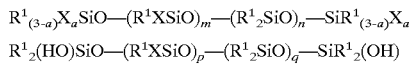

Herein, $R^1$ is a monovalent hydrocarbon group free of aliphatic unsaturation, X is an alkenyl-containing organic group, a is an integer of 0 to 3, preferably 1, m is a number of at least 0, n is a number of at least 100, a and m are not 0 at the same time, p is a number of at least 1, and q is a number of at least 100.

Preferred groups represented by $R^1$ are those of 1 to 10 carbon atoms, for example, alkyl groups such as methyl, ethyl, propyl and butyl, cycloalkyl groups such as cyclohexyl, aryl groups such as phenyl and tolyl, with methyl and phenyl being most preferred.

Preferred alkenyl-containing organic groups represented by X are those of 2 to 10 carbon atoms, for example, vinyl, allyl, hexenyl, octenyl, acryloylpropyl, acryloylmethyl, methacryloylpropyl, cyclohexenylethyl and vinyloxypropyl.

The polydiorganosiloxane may be oily or gum-like and have a viscosity of at least 50 mPa·s at 25° C., especially at least 100 mPa·s at 25° C. A mixture of two or more polydiorganosiloxanes is acceptable.

Component (B) is a polyorganosiloxane containing $R^1_3SiO_{0.5}$ units and $SiO_2$ units wherein $R^1$ is as defined above, and the molar ratio of $R^1_3SiO_{0.5}$ units/$SiO_2$ units is 0.6–1.7:1. If the molar ratio of $R^1_3SiO_{0.5}$ units/$SiO_2$ units is less than 0.6, adhesive strength and tack may be low. If the molar ratio is more than 1.7, adhesive strength and holding power may be low. The polyorganosiloxane may contain hydroxy groups, preferably in an amount of 0 to 4.0% by weight. A mixture of two or more polyorganosiloxanes is acceptable.

A simple blend of components (A) and (B) may be used. If component (A) contains one of the formula:

$$R^1_2(HO)SiO-(R^1XSiO)_p-(R^1_2SiO)_q-SiR^1_2(OH),$$

the condensation product of components (A) and (B) may be used. Such a product may be obtained by dissolving a mixture of components (A) and (B) in a solvent such as toluene, and effecting condensation reaction in the presence of a basic catalyst at room temperature or under reflux.

The blend ratio of component (A)/(B) is preferably from 20/80 to 80/20 by weight, especially from 30/70 to 70/30 by weight.

Component (C), which serves as a crosslinking agent, is an organohydrogenpolysiloxane having at least two, preferably at least three hydrogen atoms each attached to a silicon atom per molecule. It may be linear, branched or cyclic.

Preferred examples of component (C) are given below, but are not limited thereto.

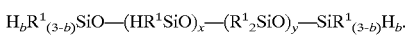

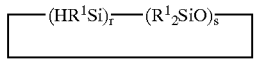

Herein, $R^1$ is a hydrocarbon as defined previously, b is an integer of 0 to 3, and x and y are such integers that the organohydropolysiloxane may have a viscosity of 1 to 5,000 mPa·s at 25° C. The letter r is an integer of at least 2, s is an integer of at least 0, r+s is at least 3, preferably r+s is from 3 to 8.

The organohydropolysiloxanes should preferably have a viscosity of 1 to 5,000 mPa·s at 25° C. and may be used in admixture of any.

Component (C) is used in an amount to provide 0.5 to 20 mol, especially 1 to 15 mol of SiH groups per mol of alkenyl groups in component (A). On this basis, less than 0.5 mol of SiH groups may lead to a lower crosslinking density which may entail a low holding power, whereas more than 20 mol of SiH groups may lead to losses of adhesive strength and tack.

Component (D) is a retarder, examples of which include 3-methyl-1-butyn-3-ol, 3-methyl-1-pentyn-3-ol, 3,5-dimethyl-1-hexyn-3-ol, 1-ethynylcyclohexanol, 3-methyl-3-trimethylsiloxy-1-butyne, 3-methyl-3-trimethylsiloxy-1-pentyne, 3,5-dimethyl-3-trimethylsiloxy-1-hexyne, 1-ethynyl-1-trimethylsiloxycyclohexane, bis(2,2-dimethyl-3-butynoxy)dimethylsilane, 1,3,5,7-tetramethyl-1,3,5,7-tetravinylcyclotetrasiloxane, and 1,1,3,3-tetramethyl-1,3-divinyldisiloxane.

Component (D) is blended in an amount of 0 to 5.0 parts by weight, especially 0.05 to 2.0 parts by weight per 100 parts by weight of components (A) and (B) combined. More than 5.0 parts by weight of component (D) may hinder cure.

Component (E) is a platinum catalyst, examples of which include chloroplatinic acid, alcohol solutions of chloroplatinic acid, the reaction products of chloroplatinic acid with alcohols, the reaction products of chloroplatinic acid with olefins, and the reaction products of chloroplatinic acid with vinyl-containing siloxanes.

The platinum catalyst is added in an amount to give 1 to 5,000 ppm, especially 5 to 2,000 ppm of platinum based on the weight of components (A) and (B) combined. Less than 1 ppm of platinum may lead to under-cure, a low crosslinking density and a low holding power whereas more than 5,000 ppm of platinum may reduce the serviceable time of the solution.

To the addition curing type silicone pressure-sensitive adhesive composition described above, the phenolic antioxidant is added as component (F). The preferred amount of component (F) added is 0.1 to 10 parts by weight per 100 parts by weight of components (A) and (B) combined. Less than 0.1 part of component (F) may be insufficient to eliminate the adhesive residue whereas more than 10 parts may lead to a low holding power.

In addition to the above components, the silicone pressure-sensitive adhesive composition of the invention may further contain optional components. Included are non-reactive polyorganosiloxanes such as polydimethylsiloxane and polydimethyldiphenylsiloxane; solvents for lowering the viscosity upon application, for example, aromatic solvents such as toluene and xylene, aliphatic solvents such as hexane, octane and isoparaffin, ketone solvents such as methyl ethyl ketone and methyl isobutyl ketone, ester solvents such as ethyl acetate and isobutyl acetate, and ether solvents such as diisopropyl ether and 1,4-dioxane, and mixtures thereof; dyes and pigments.

The silicone pressure-sensitive adhesive composition formulated as above may be applied to a variety of supports and cured under predetermined conditions to form a pressure-sensitive adhesive layer.

Suitable supports include plastic films such as polyester, polytetrafluoroethylene, polyimide, polyphenylene sulfide, polyamide, polycarbonate, polystyrene, polypropylene, polyethylene, and polyvinyl chloride; metal foils such as aluminum foil and copper foil; papers such as Japanese paper, synthetic paper and polyethylene-laminated paper; fabrics; glass fibers; and composite supports having a plurality of layers of the foregoing materials laminated.

To improve the adhesion between the support and the adhesive layer, the support may be pretreated as by primer coating, corona treatment, etching treatment or plasma treatment.

Well-known application methods may be used to apply the composition to the support. Use may be made of, for example, a comma coater, lip coater, roll coater, die coater, knife coater, blade coater, rod coater, kiss-roll coater and gravure coater, as well as screen printing, dipping and casting techniques.

The buildup is adjusted such that the pressure-sensitive adhesive layer as cured has a thickness of 1 to 200 $\mu$m.

Curing conditions, but are not limited thereto, include 80 to 130° C. and 30 seconds to 3 minutes in the case of addition reaction cure and 100 to 200° C. and 30 seconds to 15 minutes in the case of peroxide cure.

A pressure-sensitive adhesive tape is prepared by directly applying the composition to the support as described above. Alternatively, the composition is applied to a release film or release paper (having a release coat thereon), cured thereto, and attached to the support whereupon the adhesive layer is transferred to the support to provide a pressure-sensitive adhesive tape.

The pressure-sensitive adhesive composition or tape of the invention is used in securing electric or electronic parts made of metals, especially copper or copper alloy when etching, plating or soldering treatment is carried out thereon, and as a masking tape to lead frames when semiconductor chips are secured, bonded, wire bonded or resin encapsulated during the manufacture of semiconductor devices.

Upon excursion to high temperatures of 150 to 250° C. after the tape is attached to an adherend of metal, especially copper for holding or masking purposes, the pressure-sensitive adhesive composition or tape of the invention can be smoothly peeled therefrom without leaving adhesive residues.

EXAMPLE

Examples of the invention are given below by way of illustration and not by way of limitation. All parts are by weight, Me is methyl, Vi is vinyl and $^t$Bu is tert-butyl. Test properties are reported as measurements by the test methods described below.

Adhesive Residue

A silicone pressure-sensitive adhesive composition in solution form was applied to a polyimide film of 25 $\mu$m thick and 25 mm wide so as to give a thickness of 30 $\mu$m after curing and heat cured at 130° C. for 1 minute, obtaining a pressure-sensitive adhesive tape. This adhesive tape was attached to a metal plate (polished copper plate or cold rolled steel strip). A rubber-lined roller having a weight of 2 kg was moved one stroke over the tape for bringing the tape in pressure contact with the metal plate. The assembly was held in a dryer at 200° C. After a predetermined time, the assembly was taken out and cooled down to room temperature whereupon the tape was peeled from the metal plate. It was observed whether or not the pressure-sensitive adhesive layer underwent cohesive failure so that the adhesive was left on the metal plate surface. Ratings are based on the following criterion.

O: no adhesive residue

Δ: some adhesive residues

X : adhesive residue on entire surface

Adhesive Strength

A pressure-sensitive adhesive tape was prepared as in the adhesive residue test. The tape was attached to a stainless steel plate. A rubber-lined roller having a weight of 2 kg was moved one stroke over the tape for bringing the tape in pressure contact with the metal plate. The assembly was held for about 20 hours at room temperature. Then using a tensile tester, a force (N/25 mm) required to peel the tape from the stainless steel plate at a speed of 300 mm/min and an angle of 180° was measured.

Holding Power

A pressure-sensitive adhesive tape was prepared as in the adhesive residue test. The tape was attached to the lower side of a stainless steel plate over a bond area of 25×25 mm. A load having a weight of 1 kg was coupled to the lower side of the tape. The assembly was allowed to stand in the vertical state at 200° C. for one hour, after which a slip distance (mm) of the tape was examined under a microscope.

Example 1

A silicone pressure-sensitive adhesive composition solution was prepared by mixing 100 parts of an addition reaction curing type silicone pressure-sensitive adhesive KR-3700 (Shin-Etsu Chemical Co., Ltd.), 50 parts of toluene, and 0.6 part of a phenolic antioxidant (A) of the formula shown below, and adding 0.5 part of a platinum catalyst CAT-PL-50T (Shin-Etsu Chemical Co., Ltd.) thereto, followed by further mixing.

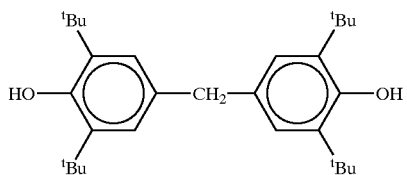

This silicone pressure-sensitive adhesive composition was examined for adhesive residue, adhesive strength and holding power, with the results shown in Table 1.

Comparative Example 1

A silicone pressure-sensitive adhesive composition solution was prepared as in Example 1, but omitting the phenolic antioxidant (A). This composition was examined for adhesive residue, adhesive strength and holding power, with the results shown in Table 1.

Comparative Example 2

A silicone pressure-sensitive adhesive composition having a siloxane content of about 60% was prepared by mixing 30 parts of an alkenyl-containing polydimethylsiloxane of the formula:

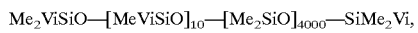

43 parts of a 70% toluene solution of a polysiloxane consisting of $Me_3SiO_{0.5}$ units and $SiO_2$ units in a ratio of 0.85/1, 27 parts of toluene, 0.38 part of a crosslinking agent of the formula:

and 0.1 part of ethynyl cyclohexanol. To 100 parts of the composition, 50 parts of toluene was added, followed by mixing. Then 0.5 part of a platinum catalyst CAT-PL-50T (Shin-Etsu Chemical Co., Ltd.) was added. Further mixing gave a silicone pressure-sensitive adhesive composition solution.

This composition was examined for adhesive residue, adhesive strength and holding power, with the results shown in Table 1.

Example 2

To the silicone pressure-sensitive adhesive composition solution of Comparative Example 2, 0.1 part of phenolic antioxidant (A) was added, followed by mixing.

This composition was examined for adhesive residue, adhesive strength and holding power, with the results shown in Table 1.

Example 3

To the silicone pressure-sensitive adhesive composition solution of Comparative Example 2, 5.0 parts of phenolic antioxidant (A) was added, followed by mixing.

This composition was examined for adhesive residue, adhesive strength and holding power, with the results shown in Table 1.

Example 4

To the silicone pressure-sensitive adhesive composition solution of Comparative Example 2, 15.0 part of phenolic antioxidant (A) was added, followed by mixing.

This composition was examined for adhesive residue, adhesive strength and holding power, with the results shown in Table 1.

Example 5

To the silicone pressure-sensitive adhesive composition solution of Comparative Example 2, 0.5 part of phenolic antioxidant (B) of the formula shown below was added, followed by mixing.

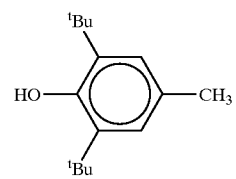

This composition was examined for adhesive residue, adhesive strength and holding power, with the results shown in Table 1.

Comparative Example 3

To the silicone pressure-sensitive adhesive composition solution of Comparative Example 2, 0.3 part of benzotriazole was added, followed by mixing.

This composition did not cure under heating conditions of 130° C. and one minute.

TABLE 1

| | Antioxidant (amount) | Metal plate | Adhesive residue | | | | | | | | | | Adhesive strength (N/25 mm) | Holding power (mm) |
|---|---|---|---|---|---|---|---|---|---|---|---|---|---|---|
| | | | 1 | 2 | 3 | 4 | 5 | 10 | 12 | 14 | 16 | 18 h | | |
| Example 1 | A (0.5) | Copper | ○ | ○ | ○ | ○ | ○ | — | — | — | — | — | 8.3 | 0.05 |
| | | Steel | — | — | — | — | — | ○ | ○ | ○ | ○ | ○ | | |
| Comparative Example 1 | nil | Copper | ○ | ○ | X | X | X | — | — | — | — | — | 8.4 | 0.04 |
| | | Steel | — | — | — | — | — | ○ | Δ | X | X | X | | |

TABLE 1-continued

| | Antioxidant (amount) | Metal plate | Adhesive residue | | | | | | | | | | Adhesive strength (N/25 mm) | Holding power (mm) |
|---|---|---|---|---|---|---|---|---|---|---|---|---|---|---|
| | | | 1 | 2 | 3 | 4 | 5 | 10 | 12 | 14 | 16 | 18 h | | |
| Comparative Example 2 | nil | Copper | ○ | ○ | Δ | X | X | — | — | — | — | — | 2.7 | 0.04 |
| Example 2 | A (0.1) | Copper | ○ | ○ | ○ | ○ | X | — | — | — | — | — | 2.8 | 0.03 |
| Example 3 | A (5.0) | Copper | ○ | ○ | ○ | ○ | ○ | — | — | — | — | — | 2.8 | 0.03 |
| Example 4 | A (15) | Copper | ○ | ○ | ○ | ○ | ○ | — | — | — | — | — | 2.9 | fell down |
| Example 5 | B (0.5) | Copper | ○ | ○ | ○ | ○ | X | — | — | — | — | — | 2.7 | 0.05 |
| Comparative Example 3 | benzotriazole (0.3) | — | adhesive did not cure | | | | | | | | | | | |

Japanese Patent Application No. 2001-290863 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A silicone pressure-sensitive adhesive composition comprising:
   (A) 20 to 80 parts by weight of an alkenyl group-containing polydiorganosiloxane,
   (B) 80 to 20 parts by weight of a polyorganosiloxane containing $R^1_3SiO_{0.5}$ units and $SiO_2$ units in a molar ratio between 0.6 and 1.7 wherein $R^1$ is an alkyl, cycloalkyl or aryl group having 1 to 10 carbon atoms,
   (C) a SiH group-containing polyorganosiloxane in an amount to provide 0.5 to 20 mol of SiH groups per mol of alkenyl groups in component (A),
   (D) 0 to 5.0 parts by weight per 100 parts by weight of components (A) and (B) combined of a retarder,
   (E) a platinum catalyst in an amount to give 1 to 5,000 ppm of platinum based on the weight of components (A) and (B) combined, and
   (F) 0.1 to 10 parts by weight per 100 parts by weight of components (A) and (B) combined of a phenolic antioxidant in the form of a phenolic compound having in a molecule a structure of the following formula:

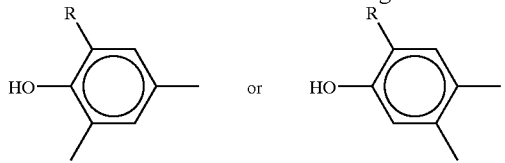

wherein R is a monovalent hydrocarbon group having 1 to 6 carbon atoms
   wherein the straight lines in the positions ortho, meta, and para to the OH group represent bonds by which the structure is chemically bonded to the remainder of the phenolic compound.

2. A pressure-sensitive adhesive tape comprising a cured layer of a silicone pressure-sensitive adhesive composition lying on at least one surface of a plastic film, said silicone pressure-sensitive adhesive composition comprising:
   (A) 20 to 80 parts by weight of an alkenyl group-containing polydiorganosiloxane,
   (B) 80 to 20 parts by weight of a polyorganosiloxane containing $R^1_3SiO_{0.5}$ units and $SiO_2$ units in a molar ratio between 0.6 and 1.7 wherein $R^1$ is a monovalent hydrocarbon group having 1 to 10 carbon atoms,
   (C) a SiH group-containing polyorganosiloxane in an amount to provide 0.5 to 20 mol of SiH groups per mol of alkenyl groups in component (A),
   (D) 0 to 5.0 parts by weight per 100 parts by weight of components (A) and (B) combined of a retarder,
   (E) a platinum catalyst in an amount to give 1 to 5,000 ppm of platinum based on the weight of components (A) and (B) combined, and
   (F) 0.1 to 10 parts by weight per 100 parts by weight of components (A) and (B) combined of a phenolic antioxidant in the form of a phenolic compound having in a molecule a structure of the following formula:

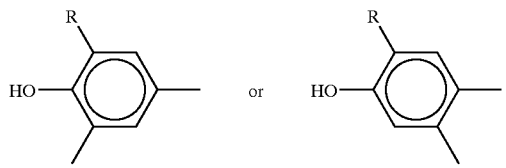

wherein R is a monovalent hydrocarbon group having 1 to 6 carbon atoms
   wherein the straight lines in the positions ortho, meta, and para to the OH group represent bonds by which the structure is chemically bonded to the remainder of the phenolic compound.

3. A copper article to which has been applied a masking tape comprising a silicone pressure-sensitive adhesive composition comprising:
   (A) 20 to 80 parts by weight of an alkenyl group-containing polydiorganosiloxane,
   (B) 80 to 20 parts by weight of a polyorganosiloxane containing $R^1_3SiO_{0.5}$ units and $SiO_2$ units in a molar ratio between 0.6 and 1.7 wherein $R^1$ is a monovalent hydrocarbon group having 1 to 10 carbon atoms,
   (C) a SiH group-containing polyorganosiloxane in an amount to provide 0.5 to 20 mol of SiH groups per mol of alkenyl groups in component (A),
   (D) 0 to 5.0 parts by weight per 100 parts by weight of components (A) and (B) combined of a retarder,
   (E) a platinum catalyst in an amount to give 1 to 5,000 ppm of platinum based on the weight of components (A) and (B) combined, and
   (F) 0.1 to 10 parts by weight per 100 parts by weight of components (A) and (B) combined of a phenolic antioxidant in the form of a phenolic compound having in a molecule a structure of the following formula:

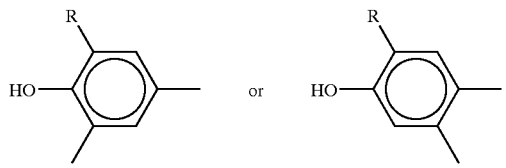

wherein R is a monovalent hydrocarbon group having 1 to 6 carbon atoms wherein the straight lines in the positions ortho, meta, and para to the OH group represent bonds by which the structure is chemically bonded to the remainder of the phenolic compound.

4. A silicone pressure-sensitive adhesive composition comprising:

(A) 20 to 80 parts by weight of an alkenyl group-containing polydiorganosiloxane, (B) 80 to 20 parts by weight of a polyorganosiloxane containing $R^1{}_3SiO_{0.5}$ units and $SiO_2$ units in a molar ratio between 0.6 and 1.7 wherein $R^1$ is a monovalent hydrocarbon group having 1 to 10 carbon atoms, (C) a SiH group-containing polyorganosiloxane in an amount to provide 0.5 to 20 mol of SiH groups per mol of alkenyl groups in component (A), (D) 0 to 5.0 parts by weight per 100 parts by weight of components (A) and (B) combined of a retarder, (E) a platinum catalyst in an amount to give 1 to 5,000 ppm of platinum based on the weight of components (A) and (B) combined, and (F) 0.1 to 10 parts by weight per 100 parts by weight of components (A) and (B) combined of a phenolic antioxidant in the form of a phenolic compound selected from the group consisting of those of the following formulas:

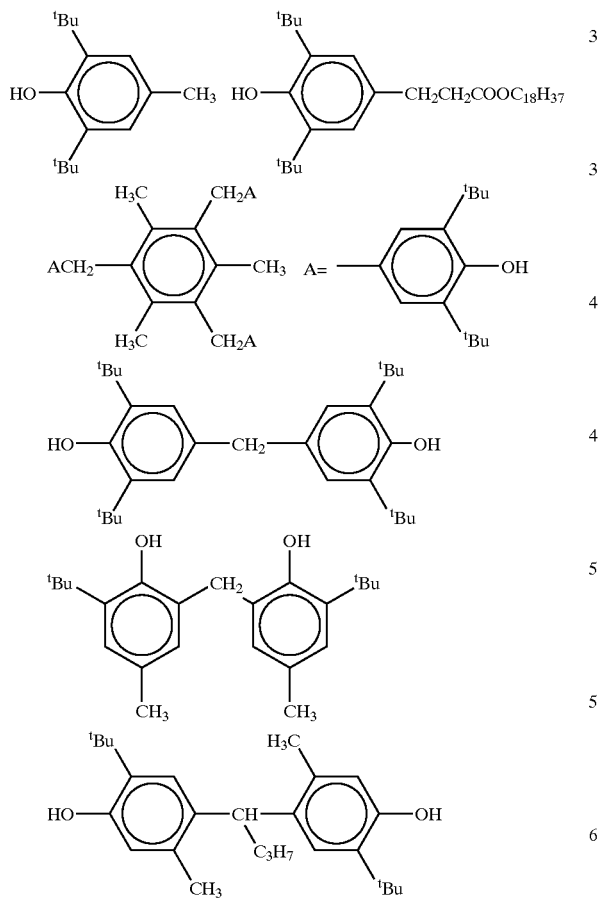

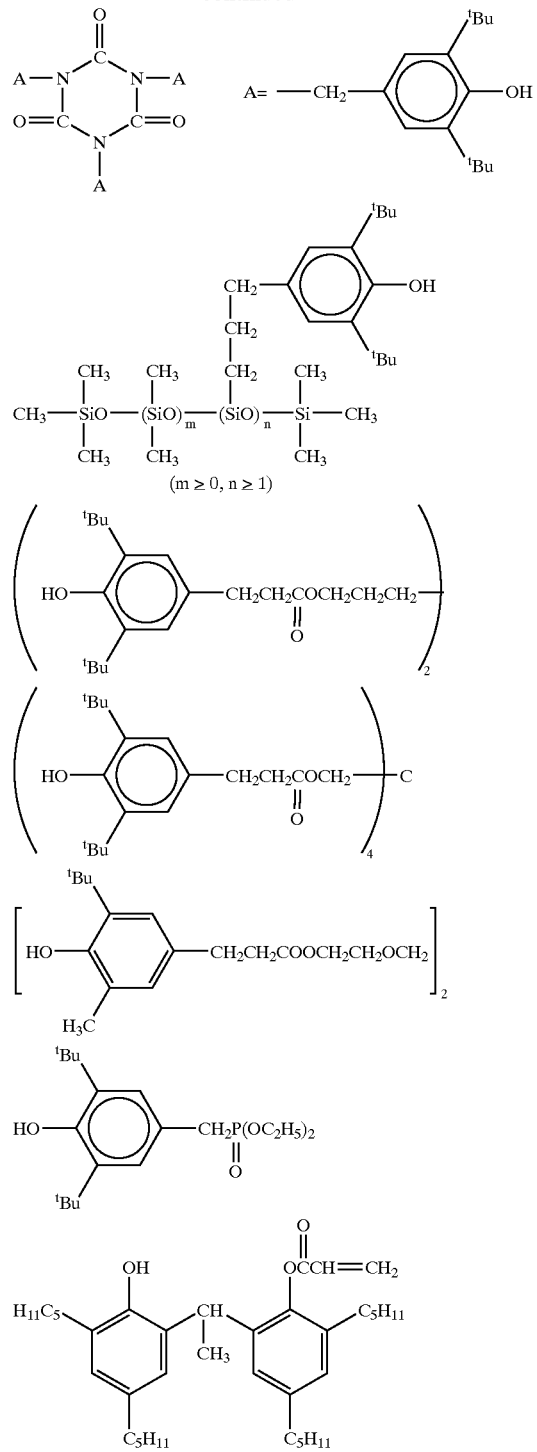

and mixtures of two or more thereof.

* * * * *